United States Patent [19]

Hiraishi et al.

[11] 4,347,283

[45] Aug. 31, 1982

[54] TRANSFER-ONTO-PLAIN PAPER TYPE PRESSURE-SENSITIVE COPYING PAPER

[75] Inventors: Shigetoshi Hiraishi, Tokyo; Toshihiko Matsushita, Funabashi, both of Japan

[73] Assignee: Mitsubishi Paper Mills, Ltd., Tokyo, Japan

[21] Appl. No.: 240,828

[22] Filed: Mar. 5, 1981

[30] Foreign Application Priority Data

Mar. 6, 1980 [JP] Japan .................................. 55-28374

[51] Int. Cl.[3] .......................... B32B 3/26; B41M 3/12

[52] U.S. Cl. ................................ 428/320.8; 427/150; 427/151; 428/914

[58] Field of Search ................ 427/150, 151; 428/307, 428/914, 320.8

[56] References Cited

U.S. PATENT DOCUMENTS

| | | | |
|---|---|---|---|
| 3,738,857 | 6/1973 | Brockette et al. | 428/308 |
| 3,955,026 | 5/1976 | Matsukawa et al. | 427/150 |
| 4,165,398 | 8/1979 | Raine et al. | 427/150 |
| 4,170,483 | 10/1979 | Shackle et al. | 427/150 |
| 4,197,346 | 4/1980 | Stevens | 427/150 |

FOREIGN PATENT DOCUMENTS

| | | | |
|---|---|---|---|
| 23613 | 7/1979 | European Pat. Off. | 428/308 |

*Primary Examiner*—Michael R. Lusignan
*Assistant Examiner*—Janyce A. Bell
*Attorney, Agent, or Firm*—Cushman, Darby & Cushman

[57] ABSTRACT

A transfer-onto-plain paper type pressure-sensitive copying paper having a colorless coating layer which forms a transferred colored image could be obtained by coating a substrate with double capsules and wax enclosing said double capsules, which double capsules have been prepared by previously forming primary microcapsules containing, as a core material, either colorless electron-donating color former or colorless electron-accepting color developer which reacts with said color former to give a colored product, enclosing the formed primary microcapsules in whichever of the color former or the color developer is not contained in the primary microcapsules, and then microencapsulating the enclosed primary microcapsules to form double capsules.

5 Claims, No Drawings

TRANSFER-ONTO-PLAIN PAPER TYPE PRESSURE-SENSITIVE COPYING PAPER

BACKGROUND OF THE INVENTION

1. Field of the Invention

This invention relates to a colorless transfer-onto-plain paper type pressure-sensitive copying paper.

2. Description of the Prior Art

A heretofore known pressure-sensitive copying paper is constituted of a "top sheet" and a "bottom sheet" where the top sheet is obtained by coating to a reverse surface of a substrate microcapsules containing a color former-containing oil as a core material prepared by dissolving a colorless electron-donating color former in a non-volatile oil and the like, and the bottom sheet is obtained by coating a colorless electron-accepting color developer to a right surface of another substrate. When two sheets are superposed so that their coated surfaces confront each other, and a pressure is applied thereto with a typewriter or the like, a colored image is obtained on the bottom sheet.

In obtaining three or more copied sheets, the required number of intermediate sheets produced by coating a color developer and microcapsules containing a color former to the right and reverse surfaces of a substrate, respectively, are inserted between the top and bottom sheets. There is also the so-called self-contained type pressure-sensitive copying paper produced by coating both microcapsules containing a color former and a color developer to the same surface of a substrate. Since no coloring material is used in such copying paper, it does not soil hands or clothes, and is widely used as office paper and the like. However, such copying paper has the defects that when it is used, at least two, usually three types of coated papers, i.e., top sheets, intermediate sheet and bottom sheet should be produced, and that a copy image can be obtained only on the intermediate sheet, the bottom sheet or a substrate coated with a developer or the like of self-contained type pressure-sensitive paper.

It has already been known that in the above-mentioned self-contained type pressure-sensitive copying paper, when the coated surface is placed on a plain paper and a pressure is applied thereto, a colored image is obtained only on the coated surface and no copy image is obtained on the plain paper.

The plain paper used herein means a substrate having a transfer side on which neither electron-donating color former nor electron-accepting color developer is present.

Pressure-sensitive copying papers in which both color former and color developer are present on the same surface of a substrate and which can form a copy image on a plain paper are disclosd in Japanese Patent Kokai (Laid-Open) No. 126111/1979, Japanese Patent Kokoku (Post-Exam Publn) No. 16728/1978 and Japanese Patent Kokai (Laid-Open) No. 159008/1979.

In Japanese Patent Kokai (Laid-Open) No. 126111/1979, it is disclosed that a coating solution prepared by adding a solid color former and a solid color developer to wax is single coated onto a substrate, and it is clearly stated that immediately after the color former and the color developer are mixed, said coating solution undergoes coloration reaction and is colored. That is to say, said Japanese Patent Kokai relates to a pressure-sensitive transfer material having a colored coating layer, such as the so-called backed carbon paper, and such a material is disadvantageous in appearance because the coating layer is colored. Japanese Patent Kokoku (Post-Exam Publn) No. 16728/1978 relates to chelate coloration, and according to it, a substrate is coated with a encapsulated reactant and then a solution of a coreactant in a solvent, and since the solvent is used, a material for the wall of the microcapsules should be resistant to the solvent and hence is limited. Such copying paper has many environmental and economic disadvantages.

In Japanese Patent Kokai (Laid-Open) No. 159008/1979, there is disclosed the use of waxes and a mode of the so-called bilayer coating in which a substrate has been coated with microcapsules which enclose oil containing a color former together with a binder, and then with a layer containing wax and a color developer. According to this mode, the substrate should be coated with a color developer after coating its whole surface with a microcapsule layer by means of an air knife coating machine or the like. Therefore an additional production process is required so that the cost increases. The microcapsules are applied together with a binder to a substrate in the same manner as in the case of the top sheet of commercially available pressure-sensitive copying paper, and therefore the microcapsule layer is hardly transferred onto plain paper, and on writing, the capsules are broken and a part of the liberated oil containing a color former moves into the substrate so that the amount of the color former participating in coloring is limited, and this is disadvantageous from the viewpoint of transferability and coloring property.

In Japanese Patent Kokoku (Post-Exam Publication) No. 12255/1973, a process for producing a cold-set ink obtained by mixing microcapsules with wax is disclosed. According to said patent publication, the cold-set ink prepared by mixing microcapsules containing a color former with wax is applied to the reverse side of paper to obtain the top sheet, and in order to obtain a trasferred image, the top sheet should be used in combination with the bottom sheet coated with a color developer, therefore such copying paper is disadvantageous from the viewpoint of production and use.

SUMMARY OF THE INVENTION

The object of this invention is to provide a transfer-onto-plain paper type pressure-sensitive copying paper free from the above-mentioned defects of prior arts.

Other and further objects, features and advantages of the invention will appear more fully from the following description.

The present inventors have found that a transfer-onto-plain paper type pressure-sensitive copying paper having a colorless coating layer which forms a transferred colored image on plain paper can be obtained by coating a substrate with double capsules and wax enclosing said double capsules, which double capsules have been prepared by previously forming primary microcapsules containing, as a core material, either colorless electron-donating color former or colorless electron-accepting color developer which reacts with said color former to give a colored product, enclosing the formed primary microcapsules in whichever of the color former or the color developer is not contained in the primary microcapsules, and then microencapsulating the enclosed primary microcapsules to form double capsules.

DETAILED DESCRIPTION OF THE INVENTION

When both color former and color developer are present in a coating layer, the coating layer is colored. When both of them are in the finely powdered form, marked coloration is observed. Even when either color former or color developer has been microencapsulated, or both of them have separately been microencapsulated and kept separate one from the other by a capsule wall, the slight coloration of the coating layer is observed. One of the causes of this phenomenon is thought that there remains a very small amount of free nonvolatile oil containing a color former or a color developer which has not been microencapsulated in the production of the microcapsules. The removal of this free oil is almost impossible on a production scale. The present inventors have already solved the problem of coloration in the coated side by using the so-called double capsules disclosed in Japanese Patent Application No. 132543/1979 by the same applicant. The present inventors have now found that a colorless transfer-onto-plain paper type pressure-sensitive copying paper which is excellent in transferability and coloring property and forms a transferred colored image on plain paper could be obtained by incorporating double capsules into wax by means of dispersion, melting or mixing and then applying the wax to the reverse side of a substrate.

The double capsules are microcapsules obtained by enclosing the primary microcapsules containing either color former or color developer, in the other of said color former or color developer and then making the enclosed microcapsules capsulated. Conversely, they are microcapsules having such a structure that one or more primary microcapsules containing either color former or color developer are present in microcapsules containing the other of said color former or color developer.

In case of the so-called self-contained pressure-sensitive copying paper produced only by applying double capsules together with a binder or the like to a substrate, on writing or typing on the coated side of the copying paper placed upon plain paper, a mirror image of the written or typed image having sufficient color depth can be obtained on the reverse side, i.e., the coated side, however the color density of a transferred image obtained on the plain paper is by far smaller than that of the mirror image and is not sufficient.

As the color former used in this invention, colorless electron-donating organic compounds may be used. Examples of said color formers are triarylmethane compounds such as 3,3-bis(p-dimethylaminophenyl)-6-dimethylaminophthalide, 3,3-bis(p-dimethylaminophenyl)phthalide, 3-(p-dimethylaminophenyl)-3-(1,2-dimethylindole-3-yl)phthalide, 3-(p-dimethylaminophenyl)-3-(2-methylindole-3-yl)phthalide, 3-(p-dimethylaminophenyl)-3-(2-phenylindole)-3-yl)phthalide, 3,3-bis(9-ethylcarbazole-3-yl)-5-dimethylaminophthalide, and the like; dimethylmethane compounds such as 4,4'-bis-dimethylaminobenzhydrinbenzyl ether, N-halophenyl-leucoauramine, N-2,4,5-trichlorophenyl-leucoauramine, and the like; xanthene compounds such as rhodamine B-anilinolactam, 3-dimethyamino-7-methoxyfluran, 3-diethylamino-7-chlorofluoran, 3-diethylamino-6,8-dimethylfluoran, 3-diethylamino-7-methylaminofluoran, 3,7-diethylaminofluoran, 3-diethylamino-7-dibenzylaminofluoran, 3-diethylamino-chloroethylmethylaminofluoran, and the like; thiazine compounds such as benzoylleucomethylene blue, p-nitrobenzylleucomethylene blue, and the like; and spiro compounds such as 3-methyl-spirodinaphthopyran, 3-ethylspirodinaphthopyran, 3,3'-dichlorospirodinaphthopyran, 3-propyl-spirodibenzopyran, and the like. They are used alone or in combination.

As the color developer, there are known, for example, inorganic acidic materials such as acidic clay, activated clay, kaolin, zeolite, bentonite, attapulgite, and the like, phenol developers such as substituted phenols, phenol-formalin condensation products, alkylsubstituted phenol-formalin condensation products, arylsubstituted phenol-formalin condensation products, etc. and metal salts thereof, benzoic acid, chlorobenzoic acid, toluic acid, salicyclic acid, 5-tert-butylsalicylic acid, 3,5-di-tert.-butylsalicylic acid, 3,5-di(methylbenzyl)salicylic acid, etc. and metal salts thereof. They are used alone or in combination.

The primary encapsulation is carried out by a method well known by those skilled in the art, i.e., a monomer polymerization method, a phase-separation method or a spray-drying method.

A method for producing double capsules containing a combination of a color former and a color developer is disclosed in Japanese Patent Application No. 132543/1979, and simply, the double capsules can easily be produced by using an in situ encapsulation method, forming microcapsules of polymer wall such as ureaformaldehyde polymer wall or the like, and adjusting a core material to a viscosity in the range from 40 to 150,000 cps (25° C.). The core material is a solution or a dispersion of a color former or a color developer in nonvolatile oil such as vegetable oil, animal oil, mineral oil, synthetic oil, or the like, and is used as it is when it has a viscosity in the prescribed range and is used after adjusting the viscosity depending upon the purpose when it has a viscosity out of the prescribed range.

As the wax used in this invention, there may be used animal wax such as beeswax, spermaceti, China wax, lanolin, and the like; vegetable wax such as candelilla wax, carnauba wax, Japan wax, rice wax, sugar cane wax, and the like; mineral wax such as montan wax, ozokerite, lignite wax, and the like; petroleum wax such as paraffin wax, microcrystalline wax, and the like; modified wax such as montan wax derivatives, paraffin wax derivatives, microcrystalline wax derivatives, and the like; hydrogenated wax such as castor wax, opal wax, and the like; synthetic wax such as low molecular weight polyethylene and derivatives thereof, acra wax, distearylketone, fatty acid amides, and the like. They are used alone or in combination.

Among waxes, there are those which inhibit the coloration of a transferred image, for example, saturated fatty acid amides having 14 or less carbon atoms and unsaturated fatty acid amides having one or more unsaturated bonds. The amount of them used should carefully be determined from the relationship between the transfer efficiency and the color density. However, other waxes which do not inhibit the coloration may be used in an optional amount. Preferably, they are used in the range from 20% to 85% of the total applied amount.

As a method for producing a transfer-onto-plain paper type pressure-sensitive copying paper of this invention, there may optionally be selected, for example, a method comprising making double capsules into a water-dispersed coating color, and then coating the whole surface of a substrate with the coating color by using a general coator such as an air knife coater or the like, or a method comprising drying double capsules by spray drying or the like, uniformly mixing them at the melting point of the wax to prepare a coating color, and then printing the coating color on a part of a support by using a usual carbon printing machine.

In preparing a coating color of this invention, agents for modifying properties of the solution may be added depending upon various coaters and printing machines. As said agents, there are, for example, viscosity-increasing agents which keep viscosity constant, surfactants which modify dispersability, and the like, but are, of course, not limited thereto.

As the substrate on which the coating layer of this invention is formed, paper is mainly used, though various nonwoven fabrics, plastics film, synthetic paper, metallic foil and composite sheets obtained by combining them are also used.

This invention is further explained below concretely referring to Examples. In all Examples, "parts" is by weight.

EXAMPLE 1

(1) A dispersion of double capsules containing a color former and a color developer was prepared in the following manner.

In 100 parts of a 10% aqueous ethylene-maleic anhydride copolymer solution were dissolved 200 parts of water, 10 parts of urea and 1 part of resorcin, and the resulting solution was adjusted to pH 3.5 with a 20% aqueous sodium hydroxide solution. Subsequently, 20 parts of crystal violet lactone was dissolved with heating in 180 parts of Hysol SAS-N-296 (manufactured by Nihon Petrochemistry Co., Ltd.), and the thus obtained solution was added to the above-mentioned aqueous mixed solution and emulsified. After 26 parts of a 37% aqueous formaldehyde solution was added to the resulting emulsion, the system was subjected to reaction for 3 hours while maintaining its temperature at 55° C., and then cooled to obtain a dispersion of capsules containing the color former. Next, 20 parts of p-phenylphenol resin was dissolved with heating in 30 parts of Hysol SAS-N-296, followed by adding thereto 50 parts of the above-mentioned 40% dispersion of microcapsules containing the color former, and the resulting mixture was sufficiently stirred. Subsequently, the mixture was added to 60 parts of a 10% aqueous ethylene-maleic anhydride copolymer solution and emulsified. An aqueous solution of 5 parts of urea and 0.5 part of resorcin in 100 parts of water was added to the resulting emulsion, followed by adding thereto 13 parts of a 37% aqueous formaldehyde solution. The temperature of the system was maintained at 55° C. for 4 hours with stirring, after which the system was cooled. The resulting dispersion of double capsules is composed of primary microcapsules containing the color former as a core material, and the color developer which enclose said primary microcapsules.

(2) A hundred and thirty-three parts of the 30% double capsules dispersion prepared in the above-mentioned (1), 89 parts of a paraffin wax emulsion and 67 parts of a 30% carnauba wax emulsion were mixed, followed by adding thereto 211 parts of water, whereby a coating color having 20% solids was prepared. Said coating color was applied to the surface of paper having a basic weight of 48 g/m$^2$ by means of a Mayer bar to obtain a transfer-onto-plain paper type pressure-sensitive copying paper having an almost colorless coating layer. When the coated side of said pressure sensitive copying paper was superposed on wood free paper and a pressure was applied thereto, by means of an IBM 82C electric typewriter (typing pressure 5), a clear blue transferred colored image having a large color depth could be obtained on the surface of the wood free paper.

(3) For comparison, according to the formulation generally used in self-contained type pressure-sensitive copying paper, 70 parts of wheat starch and 100 parts of a 10% aqueous oxidized starch solution in place of the wax used in the above-mentioned (2) were added to 67 parts of the 30% double capsules dispersion prepared in the above-mentioned (1), followed by adding thereto 260 parts of water, whereby a 20% coating color was prepared.

Said coating color was applied to paper having a basis weight of 48 g/m$^2$ in the same manner as in (2). When the coated side was superposed on fine quality paper and a pressure was applied thereto by means of a typewriter, a clear colored image having a large color density (sharp image) could be obtained on the coated side, however a transferred colored image having only a small color density could be obtained on the surface of the wood free paper and therefore the results were not satisfactory.

EXAMPLE 2

The double capsules dispersion obtained in Example 1 was dried by means of a spray dryer to isolate double capsules. Forty parts of said isolated double capsules, 20 parts of paraffin wax, 10 parts of carnauba wax and 30 parts of castor wax were melted and mixed, and then applied by printing to the surface of paper to obtain a transfer-onto-plain paper type pressure-sensitive copying paper having an almost colorless coating layer. When the printed side of said pressure-sensitive copying paper was superposed on wood free paper and a pressure was applied thereto, by means of a typewriter, a clear blue transferred colored image having a large color density could be obtained on the surface of the wood free paper.

What is claimed is:

1. A transfer-onto-plain paper type pressure-sensitive copying paper produced by coating a substrate with double capsules and wax enclosing said double capsules, which double capsules have been prepared by previously forming primary microcapsules containing, as a core material, either colorless electron-donating color former or colorless electron-accepting color developer which reacts with said color former to give a colored product, enclosing the formed primary microcapsules in whichever of the color former or the color developer is not contained in the primary microcapsules, and then microencapsulating the enclosed primary microcapsules to form double capsules.

2. A transfer-onto-plain paper type pressure-sensitive copying paper according to claim 1, wherein the double capsules contain one or more primary capsules.

3. A transfer-onto-plain paper type pressure-sensitive copying paper according to claim 2, wherein the primary capsules are obtained by any of a monomer polymerization method, a phase separation method and a spray-drying method.

4. A transfer-onto-plain paper type pressure-sensitive copying paper according to claim 1, wherein the double capsules were obtained by an in situ encapsulation method.

5. A transfer-onto-plain paper type pressure-sensitive copying paper according to claim 1, wherein the substrate is any of paper, nonwoven fabric, plastics film, synthetic paper, metallic foil and composite sheets obtained by combining them.

* * * * *